May 25, 1954     W. F. HOWELL     2,679,071
MOTE EXTRACTOR FOR COTTON GINS
Filed June 18, 1951     2 Sheets-Sheet 1
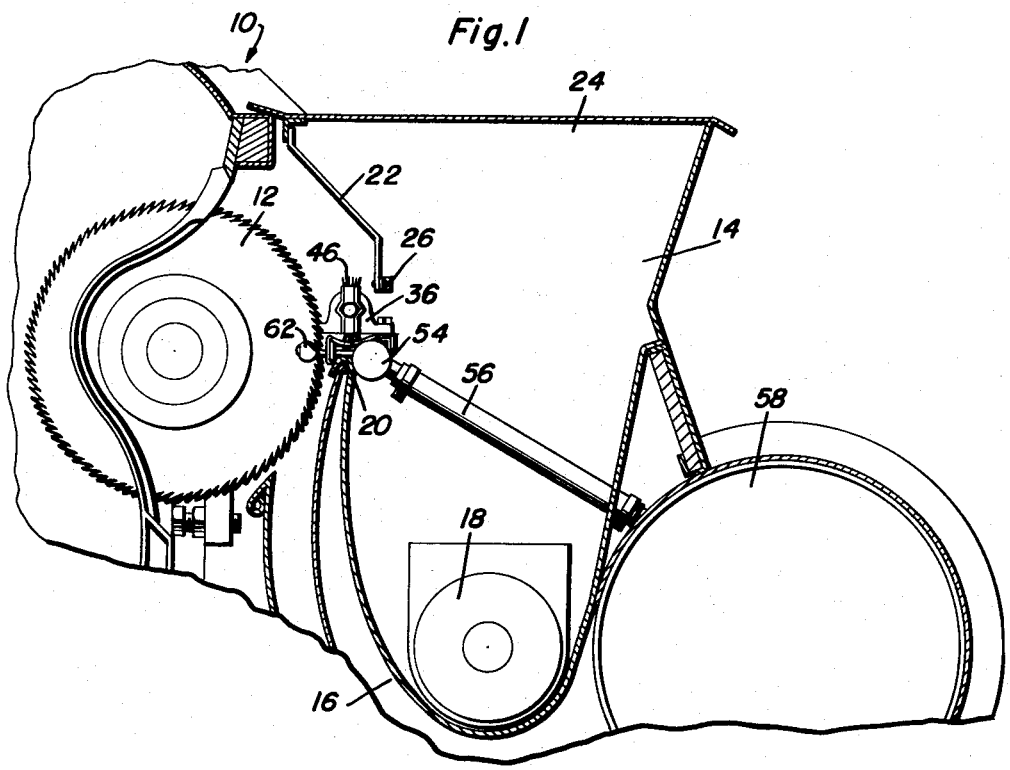
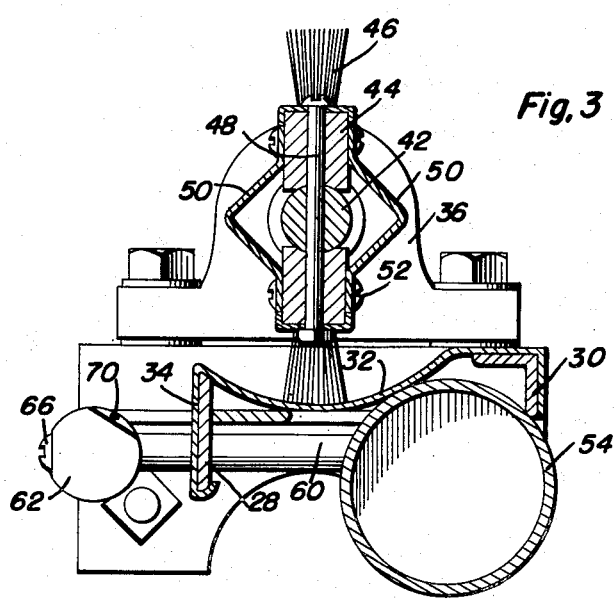
William F. Howell
INVENTOR.

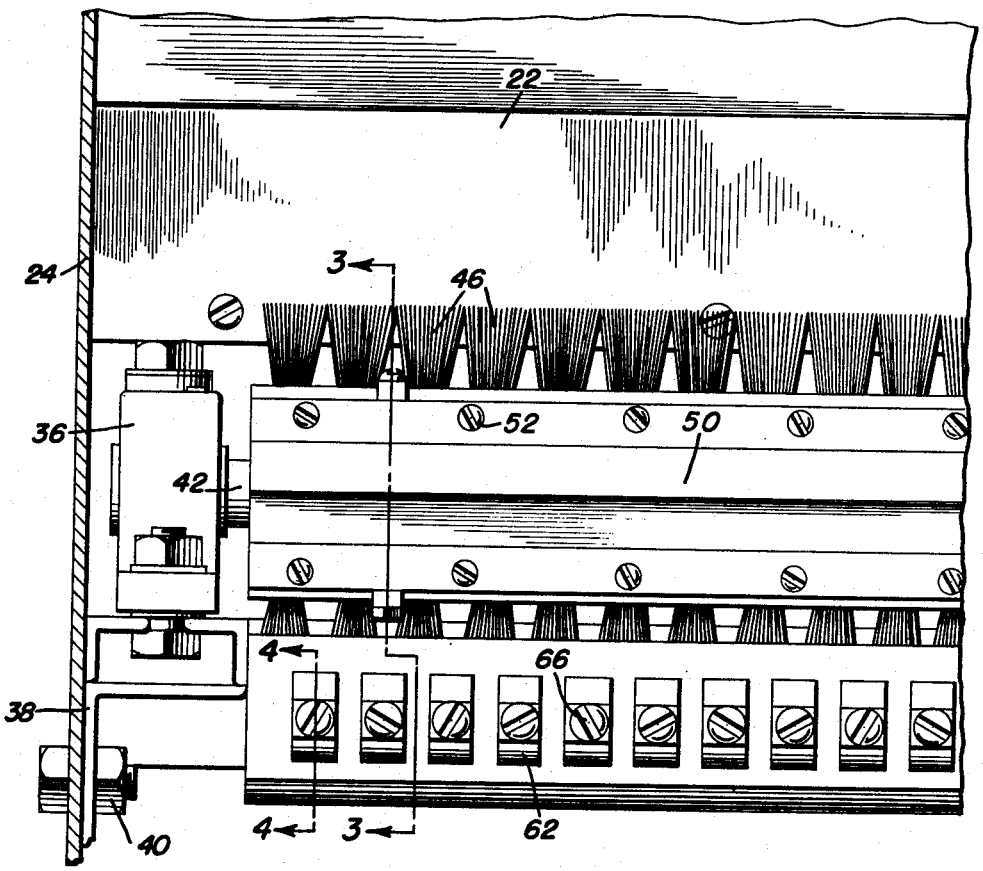
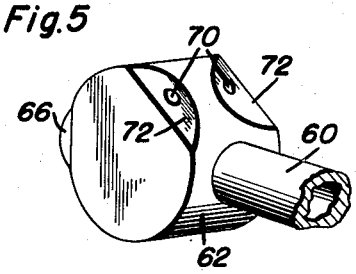
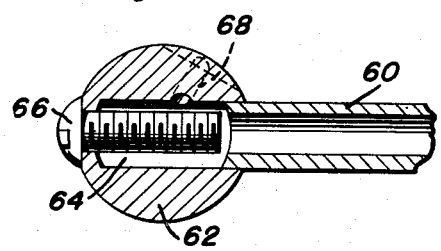

Patented May 25, 1954

2,679,071

UNITED STATES PATENT OFFICE 2,679,071

MOTE EXTRACTOR FOR COTTON GINS

William F. Howell, Progresso, Tex., assignor of one-half to Donald B. McGregor, Mercedes, Tex.

Application June 18, 1951, Serial No. 232,143

4 Claims. (Cl. 19—58)

1

This invention comprises novel and useful improvements in a mote extractor for cotton gins and more specifically pertains to an attachment which may be easily applied to conventional commercial cotton gins to facilitate and render more efficient the extraction of motes and foreign matter from the cotton and to improve the quality of the ginned cotton.

The principal object of this invention is to improve the operation of conventional cotton gins by preventing the accumulation of motes and foreign matter adjacent the gin saws, thereby eliminating the frequent source of gin fires.

A further object of the invention is to improve the operation of conventional cotton gins by removing motes and foreign matter from the cotton with greater speed and without, in any way, additionally machining the cotton, thereby obtaining an improved quality of cotton having a more unimpaired natural strength and fiber.

Yet another object of the invention is to provide an attachment for conventional cotton gins which will positively remove motes and foreign matter from the immediate vicinity of the gin saws; will improve the efficiency of operation of the saws by cleansing the same by blasts of air directed against the saws during the turning operation; and wherein the light engagement of the rotary brush with the cotton upon the gin saw blades is rendered more effective in removing motes and trash from the cotton by the application of air blasts against the saw blades.

Yet another object of the invention is to provide an attachment of the foregoing character which may be quickly and easily applied to conventional gin stands; shall be of relatively inexpensive construction; shall be capable of adjustably proportioning the air blasts to be delivered to each jet saw blade; and shall be sturdy and durable in use and highly efficient for the purposes intended.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a fragmentary vertical sectional view through a portion of a conventional cotton gin showing the manner in which the attachment, in accordance with this invention, is applied thereto;

Figure 2 is a fragmentary detail view, parts being shown in vertical section and chiefly showing in front elevational view the arrangement of the attachment in accordance with this invention;

Figure 3 is a vertical transverse sectional detail view, taken substantially upon the plane indicated by the section line 3—3 of Figure 2;

Figure 4 is a vertical transverse sectional detail view taken substantially on the plane indicated by the section line 4—4 of Figure 2 and showing the construction of one of the adjustable air nozzles of the invention; and Figure 5 is a perspective view of one of the nozzles, a portion of an air supply conduit being shown connected therewith.

Reference is now made more specifically to the accompanying drawings, wherein like numerals designate similar parts throughout the various views, the numeral 10 designating generally the portion of any conventional form of cotton gin to which the present invention may be applied.

The usual gin saws are indicated at 12, while the mote chamber indicated at 14 is provided with a seed trough 16 at its lower portion in which is received the customary seed conveyor indicated at 18. The conventional gin further includes the mote rail 20. It is a very important and prime object of this invention to provide means for automatically removing and preventing the accumulation of motes or foreign matter adjacent the mote rail 20 and the saw blades of the gin, which is a frequent cause of fires.

The attachment in accordance with this invention includes a baffle plate 22 which is suitably attached to the top wall of the mote chamber 14 and extends entirely across the gin stand, being attached to the side walls 24 of the stand as by fastening brackets 26. The lower end of the baffle terminates closely adjacent the gin saws as shown in Figure 1 to provide a relatively narrow passage therebetween.

Secured to front and back rails, 28 and 30 which extend across the gin stand between the side walls 24 thereof, is a partition 32 of sheet metal which is preferably arcuate in cross section the same having its back end secured to the rail 30 in any desired manner, and having its front end bent downwardly upon and secured to the front rail 28 as at 34. The front portion 34 of the partition extends into close proximity to the gin saws 12 and, as small a clearance is left therebetween as is found to be practical for working conditions.

The attachment further includes pillow blocks 36 which are carried by support brackets 38 fastened as by bolts for each of the side walls 24 of the gin stand, these pillow blocks serving to journal a brush shaft 42 which is disposed above the partition 32, has one extremity extending through one of the side walls of the gin stand. This extending portion is adapted to be connected to any suitable source of power whereby the shaft 42 may be rotated independently of the gin saws 12 and in a direction of rotation which is the reverse of that of the gin saws. Since any desired driving means can be provided for the shaft 42, and since the actual driving means forms no part of the present invention, further explanation or illustration of the same is believed to be unnecessary.

Secured to opposite side of the shaft 42, see Figure 3, are mounting blocks 44 having brush bristles 46 thereon. These mounting blocks are secured to the shaft 42 as by fastening bolts 48 extending diametrically through the shaft through suitable apertures therein, and a pair of cover plates 50 are secured to the front and rear surfaces of the blocks as by fastening screws 52. As shown, each of these plates 50 may consist of a sheet of metal bent along its medial longitudinal axis to provide perpendicular or angulated portions as shown in Figure 3.

The arrangement is such that upon rotation of the shaft 42, the brushes 46 will lightly brush against the arcuate surface of the partition 32 and also will lightly brush against the lower portion of the baffle 22 as will be apparent from an inspection of Figures 1 and 2.

The rotary brush attachment is so positioned relative to the gin saws 12 that the bristles of the brushs 46 will very lightly brush the saw blades to gently separate motes or trash from the cotton fibers carried by the oppositely rotating gin saw blades. A very light brushing contact is desired so as to avoid pulling at the cotton fibers which might tend to impair their natural strength and length of staple.

As so far described, the attachment is complete for some purposes and will positively and effectively prevent the accumulations of motes and foreign matter from the vicinity of the gin saw blades. However, in accordance with this invention, the action of the rotary brush will be facilitated and rendered more effective by an air blast supplying means or asembly to be now described.

Disposed beneath the back rail 30 and in some instances fixedly secured thereto is an air pipe 54 constituting part of an air nozzle assembly. This pipe may be connected by a flexible conduit as at 56 to any suitable source of compressed air such as a compressed air rail 58 for the cotton gin.

A plurality of air delivery pipes 60 are secured to the head 54 and extend forwardly therefrom toward the gin saw blades. It is preferred to provide one pipe 60 to be disposed between each pair of adjacent blades and secured in any desired manner to the ends of the pipe 60 are air nozzles 62.

As will be best apparent from Figures 4 and 5, each of the nozzles comprises a substantially cylindrical body having an internal bore 64 communicating with the interior of the discharge pipe 60, an adjusting screw 66 being secured in this bore and being adjustable toward the end of the pipe 60 for throttling or adjusting the resistance to the flow of compressed air therefrom.

Extending through the body 62 and communicating with the bore 64, are a pair of air delivery passages 68 terminating in outlet orifice 70.

These passages are disposed in divergent relation, whereby the orifices 70 open through the relatively inclined surfaces 72 of the nozzle body 62.

It is vitally important for purposes of this invention that the nozzle 62 shall be disposed between adjacent gin saw blades with the passages 68 directed toward the adjacent blade so as to discharge a blast of air from each nozzle against the two adjacent gin saw blades. This blast of air is directed upwardly against the blades and toward the rotary brush assembly and assists in loosening motes from the cotton fibers whereby the motes and foreign matter may be more readily and effectively removed by the rotating brush.

It will thus be apparent that by this latter construction, the air blasts remove or assist in removing the motes from the cotton fibers and the brushes complete this removal or positively remove the extracted motes across the partition 32 and into the mote chamber 24, from which the motes are disposed of in the customary manner.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. In a cotton gin including saw blades, a mote extractor comprising an air nozzle assembly, means connecting said assembly to a source of air under pressure, said assembly including a plurality of air discharge nozzles positioned between the saw blades of a gin for defining blasts of air against the saw blades, a rotary brush mounted adjacent the saw blades lightly engaging the same and being rotated in a direction opposite the saw blade, a baffle plate adapted for mounting between the saw blades and the mote collection chamber of the gin, said plate and brush being mounted above said nozzle assembly, and means positioning said nozzles to direct blasts of air upwardly against the saw blades toward the rotary brush.

2. In a cotton gin including saw blades, a mote extractor comprising an air nozzle assembly, means connecting said assembly to a source of air under pressure, said assembly including a plurality of air discharge nozzles positioned between the saw blades of a gin for defining blasts of air against the saw blades, a rotary brush mounted adjacent the saw blades lightly engaging the same and being rotated in a direction opposite the saw blade, means for adjusting the rate of air flow through each of said nozzles, and means positioning said nozzles to direct blasts of air outwardly against said saw blades toward said rotary brush.

3. In a cotton gin including saw blades, a mote extractor comprising an air nozzle assembly, means connecting said assembly to a source of air under pressure, said assembly including a plurality of air discharge nozzles positioned between the saw blades of a gin for defining blasts of air against the saw blades, a rotary brush mounted adjacent the saw blades above said nozzle assembly lightly engaging the same and being rotated in a direction opposite the saw blades, each nozzle having discharge passages with divergent axes whereby each nozzle directs a blast of air upwardly against each of the adjacent saw blades toward said rotary brush.

4. In a cotton gin including saw blades, a mote extractor comprising an air nozzle assembly, means connecting said assembly to a source of air under pressure, said assembly including a plurality of air discharge nozzles positioned between the saw blades of a gin for defining blasts of air against the saw blades, a rotary brush mounted adjacent the saw blades lightly engaging the same and being rotated in a direction opposite the saw blade, each nozzle having discharge passages with divergent axes whereby each nozzle directs a blast of air outwardly against each of the adjacent saw blades toward said rotary brush.

References Cited in the file of this patent

UNITED STATES PATENTS

| Number | Name | Date |
|---|---|---|
| 510,269 | King | Dec. 5, 1893 |
| 1,155,188 | Zalondek | Sept. 28, 1915 |
| 1,308,651 | Wooldridge | July 1, 1919 |
| 1,375,986 | Vardell | Apr. 26, 1921 |
| 1,448,022 | Wood | Mar. 13, 1923 |
| 1,965,001 | Pratt | July 3, 1934 |
| 2,174,143 | Streun | Sept. 26, 1939 |
| 2,325,183 | Hopper | July 27, 1943 |
| 2,328,126 | Carr et al. | Aug. 31, 1943 |
| 2,536,781 | Streun | Jan. 2, 1951 |
| 2,562,424 | Hopper | July 31, 1951 |